UNITED STATES PATENT OFFICE 2,314,231

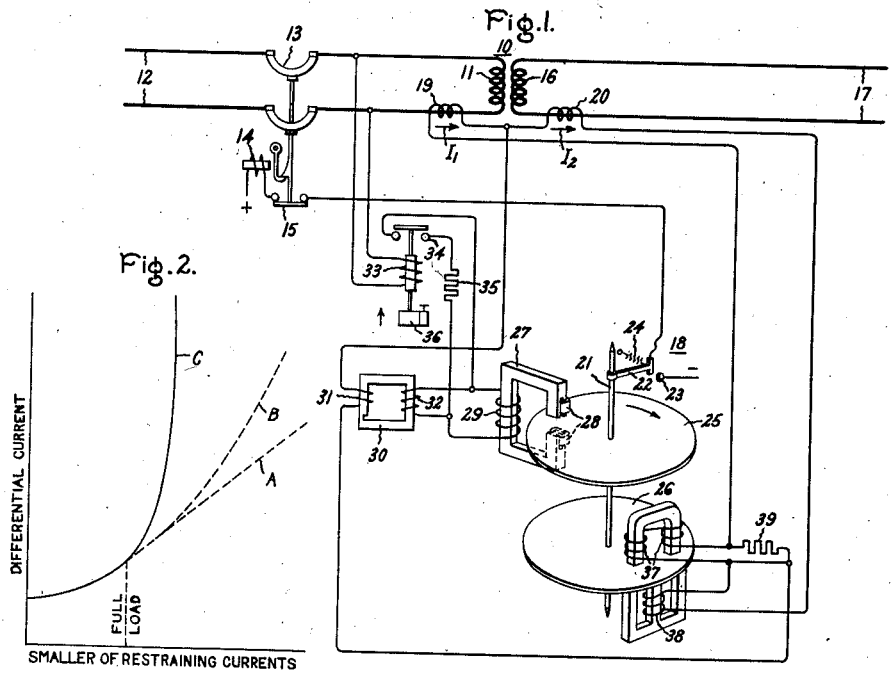
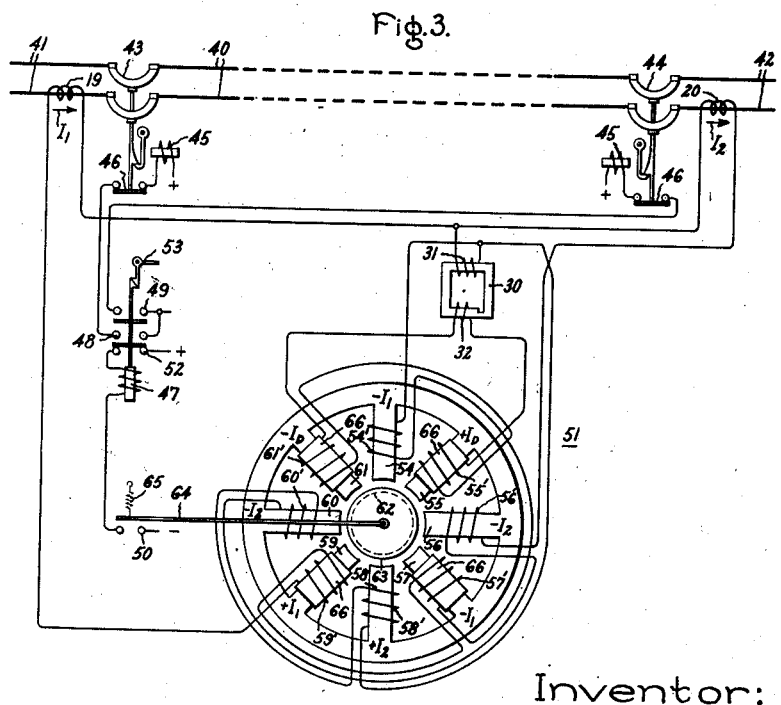

PROTECTIVE SYSTEM

Andrew J. McConnell, Upper Darby, Pa., assignor to General Electric Company, a corporation of New York Application July 25, 1941, Serial No. 403,983

16 Claims. (Cl. 175—294)

My invention relates to protective systems and it has particular relationship to protective systems employing differential relays.

For many years, relays of the ratio or percentage differential type having a substantially linear characteristic were used. These relays were usually energized so that two opposing torques were applied to the movable element of the relay, an operating torque proportional to the difference between the currents entering and leaving the protected apparatus or circuit and a restraining torque proportional to the sum of these currents. With such energization, the relays would protect apparatus against the occurrence of an internal fault and were designed to operate when the ratio of the internal fault current to the load or through current exceeded a predetermined ratio. However, in view of the substantially linear operating characteristic of these prior art differential relays, the same ratio of internal fault current to load or through currents was required for operation even though currents far exceeding full load currents existed.

Since, as a practical matter, it has been difficult heretofore to provide perfectly matched current transformers for energizing the differential relays, an operating current for operating the differential relays usually flows due to current transformer errors during high-current conditions of the system even though no internal fault may be present in the apparatus protected by the relays. For normal current ranges, this difference current or differential current may not be appreciable but for excessive currents, such as those occuring under external fault conditions, the difference between the current transformers may become greatly magnified due to saturation, both A. C. and D. C., and sufficient current may pass through the operating winding of the differential relay to cause undesired actuation thereof. Even with accurately matched current transformers, a condition of apparent unbalance may be obtained under some conditions in multi-terminal system protection because of the saturation of one current transformer carrying a larger current than the other current transformers. In order to prevent false tripping, therefore, in the prior-art arrangements on such external fault conditions, various expedients have been resorted to, which include, among others, matching of current transformers, air-gap core or air-core current transformers, increasing the ratio or percentage differential characteristic, nonlinear characteristic, harmonic restraint, time delay, and so forth. Each of these expedients is subject to some disadvantage such as high cost, reduced sensitivity, danger of failure to operate on an internal fault, etc.

In order to provide sensitive operation over normal current ranges and still prevent undesired actuation under excessive through current conditions, it has been suggested, as stated above, to vary the linear or straight-line characteristic of the conventional differential relays by causing saturation of the operating circuit so as to provide a ratio or percentage differential relay which is sensitive over the normal operation of apparatus to be protected and relatively less sensitive over higher current ranges. It is obvious, however, that, during an internal fault condition, the restraining force preventing the relay from operating must always be less than the operating force or the differential relay will fail to operate. Consequently, saturation of the operating circuit, whether by saturation of the operating magnet, itself, or by saturation of an intervening translating device such as a transformer, must be kept within reasonable bounds to obviate any possibility of the restraining force overcoming the operating force on an internal fault. On the other hand, as has been suggested heretofore, saturation of the operating circuit is a very valuable characteristic in preventing operation on a heavy through fault. If the current transformer characteristics diverge and cause an extraneous differential or apparent fault current, as is usually the case, an ideal differential relay characteristic would be, first, to prevent saturation of the operating circuit up to the maximum load current in order to give sensitive operation and permit operation on small fault currents even with load current flowing. Secondly, it would be desirable to saturate sharply the operating circuit at currents above those corresponding to full load currents and, thirdly, it would be desirable to prevent the possibility of failure to operate on an internal fault due to the sharp saturation of the operating circuit.

According, it is an object of my invention to provide a new and improved differential protective system which substantially embodies the ideal characteristic set forth above.

It is another object of my invention to provide a differential relay having an operating winding which becomes less efficient as the energization thereof increases but in which the possibility of failure to operate on an internal fault due to such change in efficiency is entirely prevented.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a schematic diagram of a protective system embodying my invention, Fig. 2 is a curve diagram to aid in the understanding of my invention, and Fig. 3 is a diagrammatic view of a protective system embodying a modification of my invention.

Although my invention is applicable to the differential protection of different forms of apparatus, such as transformers, generators, bus systems, transmission lines, and the like, I have chosen to illustrate it by way of example in Fig. 1 as applied to the protection of a transformer. Furthermore, although my invention is applicable, as will be understood by those skilled in the art, to the protection of single or polyphase apparatus, I have chosen for simplicity to illustrate my invention as applied to the protection of a single-phase translating device generally indicated as a transformer 10 having a primary winding 11 connected to a source of power 12 through a latched closed circuit breaker 13 having a trip coil 14 and an "a" switch 15 which is closed when the circuit breaker is closed and open when the circuit breaker is open. The secondary winding 16 of the transformer may be connected to any suitable circuit 17 which may be a load circuit.

In order to protect transformer 10 against internal faults, I provide a differential protective system including an electro-responsive device or differential relay generally indicated at 18 for controlling the operation of circuit breaker 13. Differential relay 18 is energized from the secondary windings of a pair of current transformers 19 and 20 located, respectively, on opposite sides of transformer 10. These current transformers should be designed with appropriate ratios as is well understood by those skilled in the art so that the outputs of the secondary windings thereof will be substantially equal, assuming no current transformer errors or saturation effects, when no fault exists within the protected apparatus such as transformer 10.

Differential relay 18 may be any of the well known types of differential relays in so far as the general structure is concerned; for example, it may be of the balanced-beam type, of the induction cup type, or as illustrated in Fig. 1, the induction disk type. As will be understood by those skilled in the art, the operating and restraining torques applied to the movable member of an induction disk type of differential relay may be applied to a single disk or, as illustrated in Fig. 1, may be applied to separate disks mounted on a common shaft. Accordingly, in Fig. 1, differential relay 18 is illustrated as comprising a rotatable shaft 21 controlling a movable contact-controlling member 22 adapted to engage a contact 23. Contact 23 and contact-controlling member 22 are connected in series with the trip circuit of circuit breaker 13 including trip coil 14 and "a" switch 15. A suitable spring 24 constantly biases rotatable shaft 21 in such a direction as to move control member 22 from contact 23 or, in other words, tends to maintain the trip circuit open.

In order to apply torques to rotatable shaft 21 of differential relay 18 for causing or preventing operation thereof, I have provided a plurality of disks 25 and 26 rigidly attached to shaft 21. An operating torque for causing contact 23 to be engaged by contact controlling member 22 in response to a fault on transformer 10 is obtained by means of an operating circuit which controls the energization of a motor element which comprises the magnetic structure 27 including a pair of shaded poles 28 disposed in spaced relationship to form an air gap therebetween within which induction disk 25 is adapted to move. Magnetic structure 27 is provided with an operating winding 29 adapted to be energized with the differential current $I_D$ discussed in greater detail hereinafter. Energization of operating winding 29 tends to produce an operating torque which rotates induction disk 25 in the direction indicated by the arrow thereon so as to cause contact-controlling member 22 to engage contact 23 and thereby to complete the trip circuit of circuit breaker 13.

It will be understood by those skilled in the art that the desired saturation of the operating circuit may be obtained by designing the magnetic structure 27 so as to be saturated sharply for high currents above those corresponding to normal load currents. This may also be accomplished, as illustrated in Fig. 1, by the provision of a saturating transformer 30 for the operating circuit of electroresponsive device 18. I have illustrated transformer 30 as comprising a primary winding 31 connected differentially across the circuit including the secondary windings of current transformers 19 and 20 so as to be energized in response to the differential current $I_D$ which is the difference between the current $I_1$ entering transformer 10 and $I_2$ leaving transformer 10 as reflected in the secondary windings of transformers 19 and 20. The secondary winding 32 of saturating transformer 30 is connected across operating winding 29 of differential relay 18.

Since I have chosen to illustrate my invention in Fig. 1 as applied to the protection of a translating apparatus, such as a transformer 10, it is necessary to provide means for preventing operation of differential relay 18 during the magnetizing in-rush currents of transformer 10 upon the energization thereof immediately after closing circuit breaker 13. Accordingly, I have provided a magnetizing in-rush protective apparatus responsive to the energization of transformer 10 for decreasing the effectiveness of the operating torque motor element of differential relay 18 until the subsidence of the magnetizing current in-rush transient. A voltage-responsive device 33 when deenergized bridges contacts 34 connected across secondary winding 32 of saturating transformer 30 in series with a suitable current-limiting resistor 35. Voltage-responsive device 33 is energized from the primary side of transformer 10 upon closure of circuit breaker 13 to open contacts 34 so as to render the operating torque motor element of differential relay 18 effective. However, voltage-responsive device 33 is provided with time delay means schematically indicated at 36 so that upon energization of transformer 10, contacts 34 will not be opened until after the subsidence of the magnetizing current in-rush transient, thereby preventing false operation of the differential protective system under transient in-rush conditions. This transient in-rush protective scheme forms no part of my present invention but is disclosed and claimed in United States Letters Patent 1,787,181, granted December 30, 1930, upon an application of O. C. Traver, and assigned to the assignee of the present application.

Theoretically, no differential current should flow through operating winding 29 unless an abnormal condition exists in transformer 10. However, as a practical matter, due to ratio errors of the current transformers or for other reasons, differential current does flow even under normal conditions and a large differential or apparent fault current may flow under heavy through fault conditions when it is not desired to trip circuit breaker 13. Consequently, differential relays are usually provided with means to produce a restraining torque to prevent operation. My invention is particularly concerned with providing a restraining torque different from the conventional restraining torque utilized in the prior art differential relays. Heretofore, the restraining torque was made proportional to, in effect, the square of the sum of the currents flowing at each end of the apparatus to be protected, or proportional to the square of one of those currents, or proportional to the sum of the squares of those currents. In my new arrangement, there is provided a restraining torque motor element for producing a restraining torque on movable shaft 21 of differential relay 18 which is proportional to the product of the currents $I_1$ and $I_2$ flowing at each end of the protected system or apparatus as reflected in the secondary windings of the associated current transformers. By this arrangement, as will be explained hereinafter, a very high relative restraining torque will be provided under heavy through fault conditions whereas, for internal fault conditions, the restraining torque might actually become an operating torque or have zero value, depending upon the type of fault and the circuit conditions involved. Thus, although the so-called restraining element may actually produce an operating torque on internal fault conditions, I shall continue to denote it as a restraining element in order to distinguish it from the differential element which, in the prior-art relays, is the only element which has torque in the operating direction. Accordingly, I have illustrated the restraining torque motor element as comprising induction disk 26 and a magnetic structure of the well-known wattmeter type having windings 37 and 38 arranged so as to produce a torque on disk 26 proportional to the product of the currents flowing in windings 37 and 38. A suitable phase-splitting impedance 39 may be provided across windings 37 to give the desired phase-angle characteristic for substantially optimum torque conditions. As illustrated, the windings 37 are connected to the secondary winding of current transformer 19 so as to have current flowing therethrough substantially proportional to the current $I_1$ reflected in the secondary winding of current transformer 19. Similarly, winding 38 is connected to the secondary winding of current transformer 20 so as to be energized by the current $I_2$ as reflected in the secondary winding of transformer 20. The differential current $I_D$ flowing in the operating winding 29, is, as will be understood by those skilled in the art, equal to $I_1 - I_2$ so that differential relay 18 is provided with an operating torque proportional to $I_D$ and a restraining torque proportional to $I_1 I_2$.

Referring now to Fig. 2, the curves A and B represent the differential relay characteristics of the prior art, depending upon whether or not the operating circuits were saturable, curve B representing a situation where the operating circuit was saturated on high through currents. The characteristic B has definite limitations in so far as its slope is concerned so that proper operation of the prior-art relay will result. For example, the relay must be able to operate on an internal fault fed from one end only. This condition gives the greatest relative restraining force on an internal fault. It is obvious that, with this operating condition, saturation of the operating circuit or magnet must not be so great that the restraining torque is greater than the operating torque at any current magnitude likely to be obtained. Thus, the saturation of the operating circuit of the prior-art relay is definitely limited. In order to lessen greatly the possibility of false operation on a through fault, the differential relay 18 has an operating characteristic represented by the curve C of Fig. 2. In spite of the sharp relative reduction of the operating torque, the relay is still operative under internal fault conditions by virtue of the fact that the windings 37 and 38 of the product type operating torque motor element may be arranged on internal fault conditions to produce an operating torque, neglecting load currents, when the fault is fed from both sides of the system or to produce substantially zero torque in the case of a single end feed. Load currents would, of course, cause a small amount of restraint but, on ordinary load currents, saturation of the operating circuit is not involved. It is observed that the curve C permits very high relative restraint for currents above load currents without affecting the operation on internal fault conditions when substantially no restraint or actually an operating action is provided.

The operation of the differential protective system of Fig. 1 will be understood by those skilled in the art in view of the detailed description included above. The fact that the restraining torque motor element is designed so that there is no restraint on an internal fault permits a differential relay characteristic of unlimited slope on an external fault as was mentioned above. Consequently, the differential circuit or operating circuit may saturate early relative to the product restraint, permitting a nonlinear relay characteristic of a type unsafe heretofore, since the slope can rise very rapidly at the higher currents with no danger of failure to operate on an internal fault.

In Fig. 3, I have chosen to illustrate my invention as applied to the differential protection of a short transmission line, wherein an induction cup type of differential relay is employed, operating in substantially the same manner as the differential relay 18 of Fig. 1. The protected section 40 of the transmission line may be connected to adjacent sections 41 and 42 by circuit interrupters 43 and 44, respectively. These circuit interrupters may be circuit breakers of the latched closed type, each having a trip coil 45 and an "a" switch 46 which is closed when the circuit breaker is closed and open when the circuit breaker is open. The trip circuits for circuit breakers 43 and 44 may be completed by means of an auxiliary relay 47 having contacts 48 and 49 connected in the respective trip circuits of circuit breakers 43 and 44. Auxiliary relay 47 is connected in a circuit including the contacts 50, controlled by the differential relay 51 to be described hereinafter, and suitable contacts 52 which interrupt the circuit of auxiliary relay 47 upon energization thereof. Auxiliary relay 47 has been illustrated schematically as of the type which is automatically latched in the operative position by latching means 53 upon energization thereof, which latching means must be manually operated to restore auxiliary relay 47 to its normal position. Energization of auxiliary relay 47 will cause contacts 48 and 49 to be closed, resulting in the tripping of circuit breakers 43 and 44 and isolation of the protected section 40 of the transmission line. It is, of course, desired to isolate the protected section 40 of this transmission line only upon the occurrence of internal faults and, to this end, differential relay 51 is provided.

Electroresponsive device or differential relay 51 is similar in construction to the electroresponsive device disclosed and claimed in United States Reissue Patent 21,813 assigned to the same assignee as the present application. As shown in Fig. 3, this device comprises a hollow magnetic stator having a plurality of inwardly projecting salients 54 to 61, inclusive, each provided with a winding designated by the corresponding reference numeral marked with a prime. The windings 55' and 61' are connected in the operating circuit which is otherwise identical with that of Fig. 1 including current transformers 19 and 20 and saturating transformer 30.

The energization of the respective windings 54' to 61' of electroresponsive device 51 are tabulated below:

| Windings: | Energizing current |
|---|---|
| 54' | $-I_1$ |
| 55' | $+I_D$ |
| 56' | $-I_2$ |
| 57' | $-I_1$ |
| 58' | $+I_2$ |
| 59' | $+I_1$ |
| 60' | $-I_2$ |
| 61' | $-I_D$ |

The structural details of electroresponsive device 51 are clearly disclosed in the above-mentioned reissue patent and form no part of this invention so a detailed description thereof will not be included herein, this relay being only schematically shown. The windings 54' to 61' energize the salients 54 to 61 and also a central magnetic member 62 concentrically positioned with respect to the ends of the salients thereby to actuate a cup-shaped rotor 63 which is movable in the gaps between the salients and the stator 62. Rotor 63 is connected to a contact-controlling member 64 adapted to bridge contacts 50 for controlling the energization of auxiliary relay 47. A suitable spring 65 continuously biases contact-controlling member 64 to the open-circuit position. Four of the salients, namely, 55, 57, 59, and 61, are provided with copper sleeves 66 around which the respective windings are wound and which function like shading coils. These copper sleeves cause the air-gap flux to lag the total flux including the leakage flux, thereby producing the desired phase shift necessary to produce the respective operating and restraining torques on rotor 63.

In Fig. 3, the poles 54, 55, 56, 60 and 61 produce an operating torque proportional to $$I_D(I_1-I_2) = I_D^2$$

The salients 56 through 60, inclusive, produce a restraining torque proportional to the product $I_1 I_2$ so that electroresponsive device 51 operates in substantially the same manner as electroresponsive device 18 of Fig. 1.

The operation of the protective system illustrated in Fig. 3 is similar to that of Fig. 1 and no further discussion will be included herewith.

Although I have disclosed two different arrangements of protective systems wherein a restraining torque substantially proportional to the product of the currents $I_1$ and $I_2$ is obtained, one by a fairly direct method and the other by a more indirect method, it should be understood by those skilled in the art that I aim in the appended claims to cover arrangements wherein a restraining torque substantially proportional to the product of $I_1$ and $I_2$ is obtained by indirect or obscure means. For example, if the so-called "restraining element" were replaced by three elements producing torques respectively proportional to $I_1^2$, $I_2^2$, and $(I_1+I_2)^2$, and these three torques were arranged so that the net torque was proportional to $$T = (I_1+I_2)^2 - I_1^2 - I_2^2 \qquad (1)$$

then a torque substantially proportional to the product of $I_1$ and $I_2$ is obtained since the above equation when expanded reduces to $$T = 2I_1 I_2 \qquad (2)$$

It will be understood by those skilled in the art that, although a differential relay scheme having a single movable element and utilizing the directional properties of $I_1$ and $I_2$ on internal and external faults has been disclosed, similar results could be obtained by using two separate relays with their contacts serially arranged in the trip circuit of the associated circuit breakers. One of these relays would be of the current-product or directional type energized in response to the product of the currents $I_1$ and $I_2$ and which would have its contacts biased to the closed position by means such as a spring when deenergized. The other relay would be a differential overcurrent relay energized with the difference between the currents $I_1$ and $I_2$. In such an arrangement, the current-product relay might be called a blocking relay to prevent the differential relay from operating incorrectly on a false differential current.

While I have described particular embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In an electroresponsive device for protecting a section of an electric circuit, a rotatable member, and means for exerting thereon a torque substantially proportional to $I_D^2$ and an opposing torque substantially proportional to the product of $I_1$ and $I_2$ where $I_1$ and $I_2$, respectively, are proportional to the currents flowing at each end of said protected section and $I_D$ is proportional to the difference between $I_1$ and $I_2$.

2. In an electroresponsive device for an electric circuit, a rotatable member, and means for exerting thereon a torque substantially proportional to the product of currents flowing at each end of said circuit and an opposing torque dependent upon the difference between the currents flowing at each end of said circuit.

3. In combination with an alternating-current electric circuit, circuit-interrupting means for controlling said circuit, an electroresponsive device having a movable element for controlling said circuit-interrupting means, and means for energizing said electroresponsive device from said circuit so that an operating torque dependent upon the difference between the currents flowing at each end of the said circuit is provided and a restraining torque proportional to the product of the currents flowing at each end of said circuit.

4. In a differential protective system for an electric circuit, circuit-interrupting means for isolating said circuit upon the occurrence of a fault thereon, means responsive to the difference between the currents entering and leaving said circuit for causing operation of said circuit-interrupting means, and means responsive to the product of said currents for rendering said last-mentioned means ineffective to operate said circuit-interrupting means unless a fault actually exists on said circuit.

5. In a protective system for an electric circuit, a device to be operated upon the occurrence of a fault on said circuit, means responsive to the difference between the currents entering and leaving said circuit for causing operation of said device, and means responsive to the product of said currents for rendering said last-mentioned means ineffective to operate said device unless an actual fault exists on said circuit.

6. In a protective system for an electric circuit, operating means energized in accordance with the difference between two variable quantities of said circuit, and means responsive to the product of said two quantities for modifying the operation of said last-mentioned means.

7. In a protective system for an electric circuit, operating means energized in accordance with the difference between two variable currents of said circuit, and means responsive to the product of said two currents for modifying the operation of said last-mentioned means.

8. In a protective system for an alternating-current circuit, a circuit-control device, means responsive to the difference between current entering and leaving said circuit for actuating said control device, means responsive to the product of said currents for opposing the actuation of said control device, and means for varying the effectiveness of said first-mentioned means relative to said second-mentioned means in dependence upon the magnitude of the currents flowing in said circuit.

9. In a protective arrangement for an alternating-current system having a pair of terminals through which current normally enters and leaves said system, current transformer means associated with said terminals, an electroresponsive device having restraint means and operating means, means including said current transformer means for energizing said operating means in accordance with the difference between the currents flowing at said terminals, and means including said current transformer means for energizing said restraint means in accordance with the product of the currents flowing at said terminals.

10. An electroresponsive device for protecting a section of an electric circuit, a movable member, means including an operating circuit for producing a torque on said movable member dependent upon the difference between two variable electrical quantities of said electric circuit, a restraining circuit including means for producing a torque on said movable member proportional to the product of said two variable quantities, and means for impairing the effectiveness of said operating circuit under predetermined conditions of said electric circuit.

11. An electroresponsive device for protecting a section of an electric circuit, a movable member, means including an operating circuit for producing a torque on said movable member dependent upon the difference between two variable electrical quantities of said electric circuit, a restraining circuit including means for producing a torque on said movable member proportional to the product of said two variable quantities, and means for saturating said operating circuit to prevent false operation of said electroresponsive device on a through fault condition of said electric circuit.

12. In a protective system for an alternating-current circuit having a pair of terminals through which current normally enters and leaves said circuit, current transformer means associated with said terminals, an electroresponsive device having a plurality of windings and a movable member upon which a torque is exerted in response to the energization of said windings, means for energizing said windings from said current transformer means so as to produce an operating torque on said movable member dependent upon the difference between the current flowing at said terminals, and an additional torque proportional to the product of the current flowing at said terminals.

13. In a protective system for an electric circuit, a device to be operated upon the occurrence of a fault on said circuit, means responsive to the difference between the currents entering and leaving said circuit for causing operation of said device, and means for opposing or aiding the operation of said device in dependence upon the relative direction of flow of said currents.

14. In a protective system for an electric circuit, a device to be operated upon the occurrence of a fault on said circuit, means responsive to the difference between the currents entering and leaving said circuit for causing operation of said device, and means responsive to the relative direction of flow of said currents for opposing said first-mentioned means on fault conditions external to said electric circuit and for aiding said first-mentioned means on internal faults when said currents have a value other than zero.

15. In a protective arrangement for an alternating-current system having a pair of terminals through which current normally enters and leaves said system, current transformer means associated with said terminals, an electroresponsive device having a pair of torque-producing means associated therewith, means including said current transformer means for energizing one of said torque-producing means in accordance with the difference between the currents flowing at said terminals, and means including said current transformer means for energizing the other of said torque-producing means to exert a torque varying in direction in accordance with the relative direction of the currents flowing at said terminals.

16. In a protective system for an electric circuit, operating means energized in accordance with a function of two variable quantities of said circuit, and means responsive to the product of said two quantities for modifying the operation of said last-mentioned means.

ANDREW J. McCONNELL.